United States Patent Office 3,013,139
Patented Dec. 12, 1961

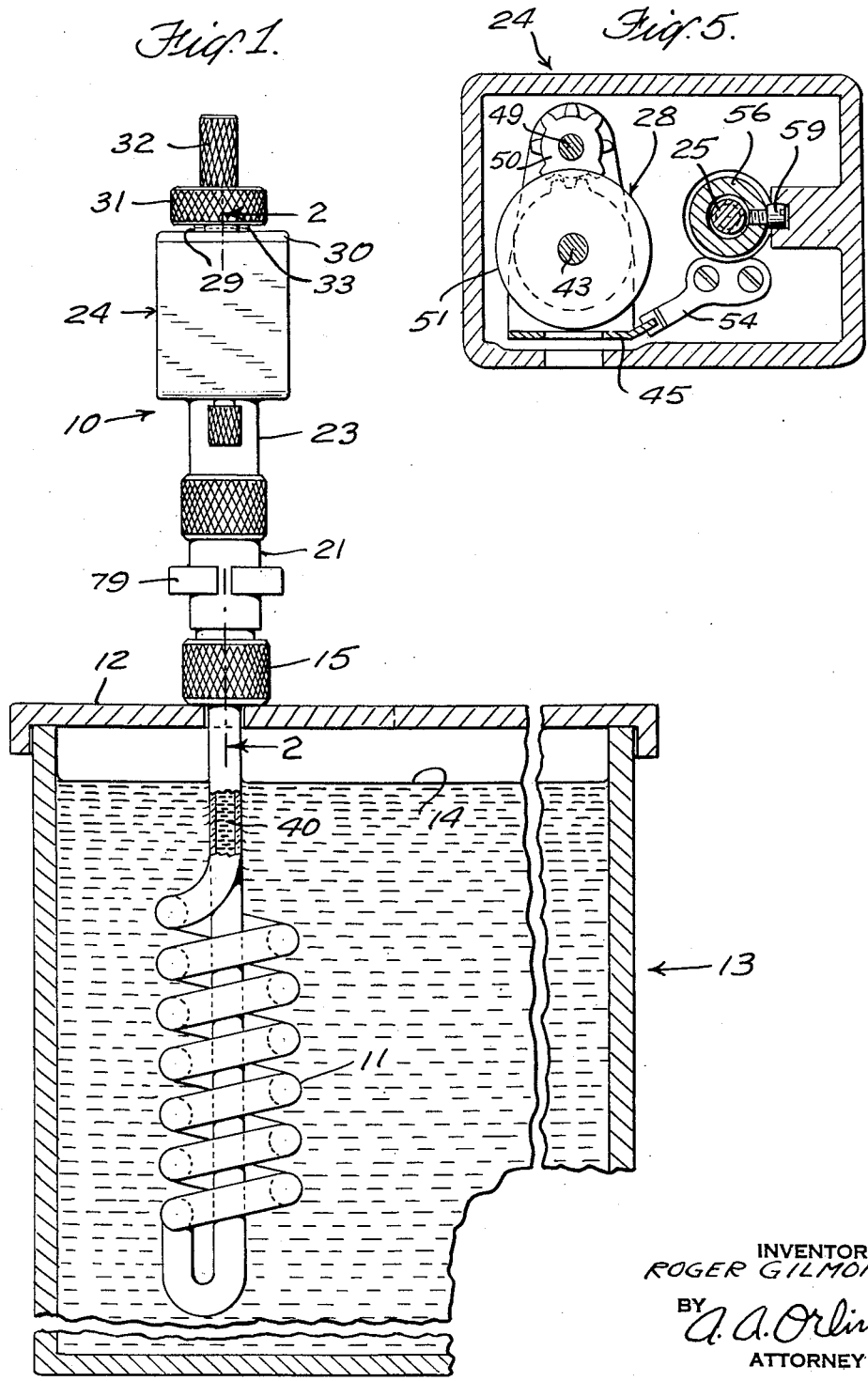

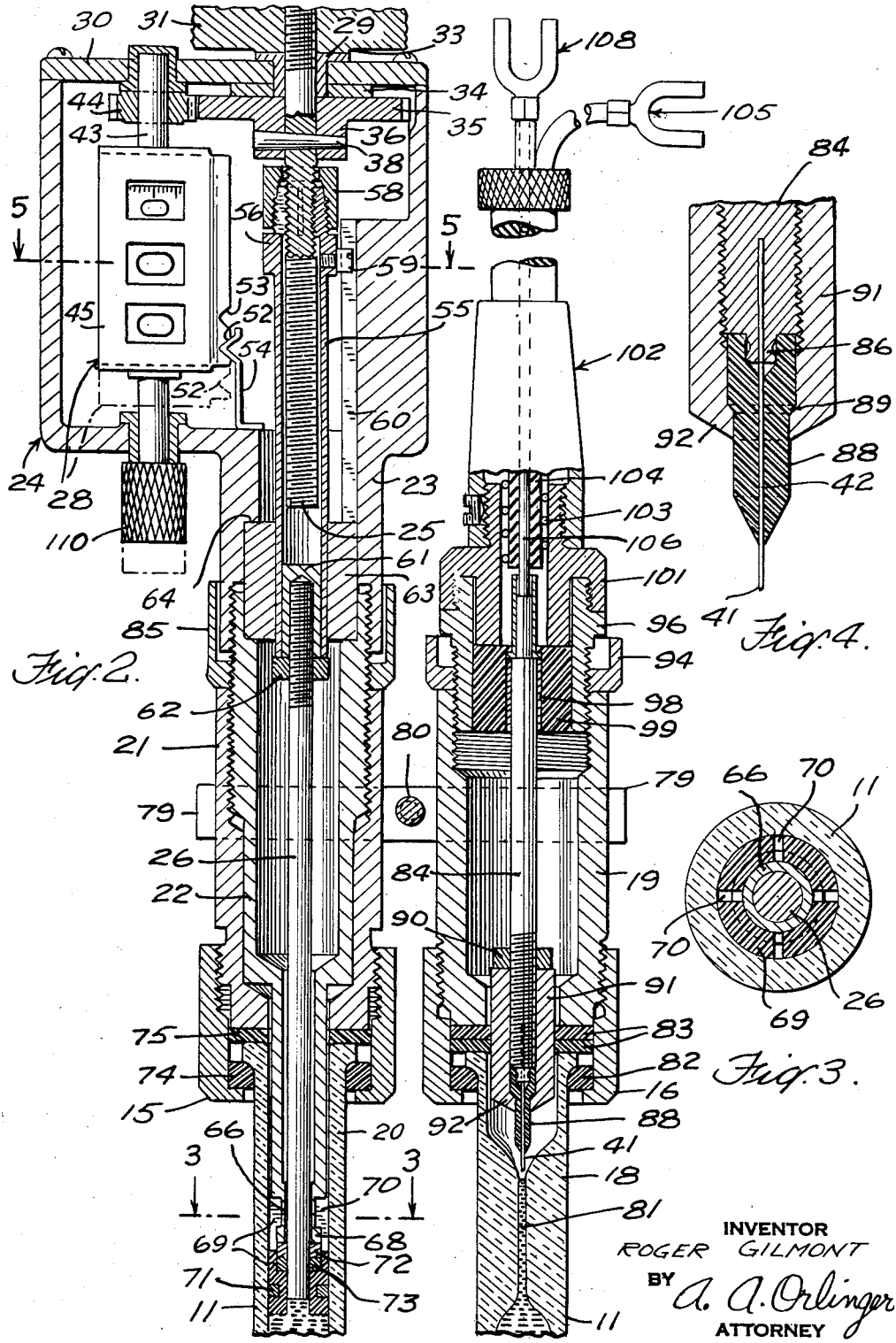

3,013,139
CONTROL DEVICE
Roger Gilmont, Douglaston, N.Y., assignor to Manostat Corporation, New York, N.Y.
Filed May 6, 1959, Ser. No. 811,394
15 Claims. (Cl. 200—141)

This invention is an improvement on thermoregulators that maintain a body of fluid at a desired temperature, by relying on the alternate expansion and contraction of an electrical-conductor, sensing liquid (e.g. mercury, contained in a reservoir such as a U-tube immersed in the fluid having its temperature regulated) responsive to temperature fluctuations in that fluid, respectively to close and break an electrical circuit that operates a relay to turn off or on means to heat the fluid.

Mercury, being the electrical-conductor, sensing liquid generally used, will be mentioned hereinafter for that liquid. Then the tube containing the temperature-sensing or electrical-conductor, sensing liquid hereinafter is briefly called the "sensing tube." Its end where the mercury is in fixed connection in the relay-operating circuit is called the "fixed-contact" of the sensing tube. The other end, where the alternate expansion and contraction of the mercury respectively contacts, and withdraws from, the contact wire to close and separately break the relay-operating circuit, is called the "switch end."

Now, this invention is that of such a thermoregulator having interposed in its relay-operating circuit a temperature-setting plunger with its head end constantly contacting the fixed-contact end of the mercury, and which plunger is mounted for axially longitudinal movement of its head relative to that end of the sensing tube and thus to set it to regulate at any selected temperature within its range, and the means for so moving that plunger is operatingly connected to a counter; and the displacement of the plunger is so proportioned to the counter operation that when the counter reading is that of the temperature desired to be maintained, the mercury in the sensing tube is adjusted to maintain at that temperature the fluid in which the tube is immersed.

Thus, a feature of the invention is that the axially longitudinal movement of the plunger and the operation of the counter are so synchronized to the means for operating both of them simultaneously that when the counter reading is that of the temperature desired to be maintained, the mercury in the sensing tube is adjusted to maintain at that temperature the fluid surrounding the tube.

Another feature of the invention is the provision of a second plunger, called the range-setting plunger, and means for adjusting its position relative to the fixed contact end of the sensing tube, in addition to the temperature-setting plunger.

A further feature of the invention is that the periphery of the plunger riding in its cylinder is gasketed against the cylinder by gaskets of a material stable at the elevated operating temperatures of the regulator and having a low coefficient of friction to permit a vacuum tight sliding fit within the cylinder.

Still another feature of the invention is the combination of a rigid yet resilient sleeve about the contact wire, with both of them jointly longitudinally axially adjust-ably mounted to permit moving the exposed end of the wire and the outer end of the sleeve to close off the open end of a restriction at the switch end of the bore of the sensing tube, so as to prevent breaking the continuity of the mercury column during shipment of the regulator.

These and other features of the invention are recognized more readily from the detailed description below of a specific embodiment of the invention illustrated by the accompanying drawings wherein—

FIG. 1 is a side view of the thermoregulator, looking at the outer jacket of the plunger cylinder hiding behind it the casing enclosing the contact wire, and showing the sensing tube immersed in a liquid bath whose temperature is to be regulated.

FIG. 2 is a vertically transverse cross-section along the line 2—2 of FIG. 1, i.e. through the counter and the axes of the plunger cylinder and casing about the contact wire, and of the upper ends of the sensing tube; with some parts shown in full elevation;

FIG. 3 is a transverse section along the line 3—3 of FIG. 2;

FIG. 4 is an enlarged fragmentary sectional view showing the contact wire and the resilient sleeve around it and their holding means; and FIG. 5 is a horizontally transverse cross-section through the housing about the counter and the operating elements.

According to the drawings, FIG. 1 shows the thermoregulator 10 with its sensing tube 11 inserted through an opening in the cover 12, over the top of the constant temperature bath 13, and immersed in the liquid 14 which the thermoregulator is to maintain at a selected temperature; and with the lower end of each of the coupling nuts 15 and 16 (FIG. 2) supported on the top of cover 12.

Referring to FIG. 2, coupling nut 16 couples the switch end 18 of the sensing tube to the casing 19 enclosing the contact wire assembly. The coupling nut 15 couples the fixed contact end 20 of tube 11 to the jacket 21 encircling the range-setting plunger 22. The latter is removably secured at its anchor end by, for example, outside threads screwed into the inside threads of the outer end of the extension neck 23 of the housing 24 enclosing operating screw spindle 25 which simultaneously motivates movement of the temperature-setting plunger 26 and operation of the temperature-indicating counter 28.

Operating screw spindle 25 extends rotatably mounted out through bushing 29 supported in the removable closure plate 30 of housing 24. Knurled turning knob 31 is held by knurled lock nut 32 removably threaded on that protruding end of spindle 25 and with a pre-selected face to face engagement at 33 between bushing 29 and hub 33 on knob 31.

Separated from closure plate 30 by a spacer washer 34 encircling the periphery of the inner end of bushing 29, a drive gear 35 having a hub 36 is mounted on spindle 25 and locked to rotate with it by key-pin 38 passing through that hub and the spindle.

Within housing 24 and disposed above spindle 25 is the temperature-indicating counter 28. It is constructed like a conventional counter and serves to indicate that the temperature-setting plunger has so positioned the switch end of the mercury column 40 (in the sensing tube 11) in relation to the exposed end 41 of the contact wire 42, that the thermoregulator will maintain the liquid in the constant temperature bath 13 (or any other fluid into which the sensing tube may be placed) at the desired temperature selected and thus set by turning the knob 31 until the numbers on the counter wheels are those of the selected temperature.

Counter 28 comprises a longitudinally axially shiftable counter-wheel shaft 43 rotatably supported in opposed bushings mounted respectively in closure plate 30 and the opposite wall of housing 24. Pinion 44 is mounted on shaft 43 and secured to it to rotate it, and is of such dimensions to mesh with drive gear 35. Counter 28 also is provided with a windowed frame 45 which is restrained against rotation by restraining arms 46 and 48 (not shown) through which are passed housing supported transfer-wheels shaft 49 carrying the transfer-wheels 50 for the counter-wheels 51 carried on shaft 43.

The bottom of windowed frame 45 has stopping notches 52 and 53 to receive alternately the V-bent loose end of detent arm 54 secured at its other end by screws to housing 24. To enable turning counter-wheels 51 independently of gear 35, counter 28 with its shaft 43 can be shifted to the position shown in broken lines (downward as in FIG. 2) so as to disengage pinion 44 from drive gear 35. In such shifted position, notch 53 engages the V-bent end of detent arm 54 which is sufficiently yieldable to permit this shifting. Thus, the counter-wheels can be rotated to reset their reading as in calibrating the thermoregulator or in changing its range of operation, and all without moving drive gear 35 and spindle 25 which otherwise would rotate with it, as more fully explained below.

The inner end of operating screw spindle 25 extends into the hollow carrier rod 55 and in threaded engagement with the internal threads on that initial portion of it (rod 55 being open at that spindle-receiving end). In addition, that end portion of carrier rod 55 is enlarged in outside diameter to provide a collar 56 which terminates in a slightly reduced diameter and outside threaded, tapered and longitudinally split neck, onto which is secured adjusting nut 58. That enables the threaded engagement of carrier rod 55 with operating spindle 25 to be made effectively, by having nut 58 allow a smooth running fit between the spindle and the carrier rod.

Restraining screw 59 is anchored within a tapped hole in collar 56; and its head is longitudinally slidably engaged in the longitudinal groove 60 in a wall of housing 24 and parallel to the axis of carrier 55. Thus, screw 59 prevents rotation of carrier 55 and provides for its axially longitudinal translation. Thus, when operating spindle 25 is turned counter-clockwise by turning knob 31, carrier 55 is moved axially and carries temperature-control plunger 26 outwardly and further into the fixed contact end of the sensing tube 11 (i.e. downward as in FIG. 2) to force the mercury closer to the contact wire 41.

The other end of carrier rod 55 is closed by a plug 61 which, by threaded engagement in an axially tapped hole, receives the anchored end of temperature-control plunger 26, which end is locked by lock-nut 62 against unscrewing during operation of carrier 55. A replaceable bushing-sleeve 63 is friction-fitted against a shoulder 64 in extension 23 (of housing 24) spaced inwardly from its open end and lock-nut 62. Thus, sleeve 63 serves slidably to support carrier 55 as it is propelled alternately upwardly or downwardly by the respectively corresponding rotation of turning knob 31.

Range-setting plunger 22 is reduced along the outer or free portion of its length to an outside diameter less than the inside diameter of the fixed-contact end 20 (of tube 11) to enable unhampered axially longitudinal movement of said reduced portion 65 of plunger 22 to and fro within that end of tube 11. Reduced portion 65 then terminates in an anchor-neck 66 of smaller diameter and having at its outside end a radially outwardly extending annular flange 68.

This outer or free end of plunger 22 is held in reciprocatably slidable and vacuum-tight fit against the inner surface of fixed-contact end 20, for example, by open-ended sleeve 69 of material which does not scratch that inner surface, such as "Teflon" plastic, or other resiliently yieldable, rigid material. Sleeve 69 is anchored against slipping off of plunger 22, by the snug fit of the annular ring about the inside of its inner end around anchor-neck 66. Radial slits 70 from the inner end of sleeve 69 for a distance at least the length of anchor-neck 66 facilitate the putting on of that sleeve. To make more certain the vacuum-tight fit between sleeve 69 and the inner surface of fixed-contact end 20, a vacuum-tightly sealing ring 71 (such as silicone rubber) is inserted in the corresponding annular groove in the outside surface of that sleeve.

The outer or free end of temperature-setting plunger 26 extends through anchor neck 66; is held in reciprocatably slidable and vacuum-tight fit within sleeve 69, by passing through bushing rings 72 and 73, and then through the outer end of sleeve 69. Rings 72 and 73 may jointly be a single ring of material that does not scratch plunger 26, such as "Teflon" plastic or other resiliently yieldable, rigid material. However, for a more certain vacuum-tight fit, one of them preferably outer ring 73 is specifically a vacuum-tightly sealing ring of silicone rubber or similar material.

Thus, the contact between the mercury and the head end of each of the plungers 22 and 26 is vacuum-tight to permit no air to be drawn into contact-end 20 of tube 11 above the mercury when plunger 26 is withdrawn in re-setting the regulator to operate at a higher specific temperature, or plunger 22 is withdrawn in re-setting to operate within a higher range. However, no vacuum-tight seal is needed where adapter ring 74 serves to lock the radially outwardly extending flange at the outer end of tube 11 axially inwardly of the radially inwardly extending flange at the outer end of coupling nut 15. The same applies to gasket 75 between the outer ends of tube 11 and jacket 21. Each of adapter ring 74 and gasket 75 may be of any suitable resiliently yieldable, rigid material, preferably "Teflon," or similar, plastic material. "Teflon" ring 74 may be split radially transversely partially or wholly at one location to allow it to be drawn over the flange at that end of tube 11.

Each of the silicone rings 71 and 73 is an organic silicone synthetic rubber. The axial length of the cavity in sleeve 69 enclosing collar 68 and rings 72 and 73 is best such as to hold those three enclosed parts snugly pressed against one another. FIG. 3 of the drawings shows slits 70 in sleeve 69 exaggerated in width. These slits can be of lower width and preferably merely simple individual cuts so long as they enable convenient slipping of the inwardly extending flange of sleeve 69 over collar 68. Coupling nut 15 is turned sufficiently for its inside threads to be screwed over the outside threads on the outer end of jacket 21 to provide firmly tight sealing or closing pressure of both the outer end of jacket 21 and of tube 11 against "Teflon" ring 75.

As set up and used, the free or lower end of temperature-setting plunger 26 always contacts the mercury 40. Plunger 26, carrier 55, screw 59, groove 60, extension neck 23, range-setting plunger 22, and jacket 21 are all in consecutive electrical contact; and all of them are of electricity conducting metal, preferably stainless steel. Each of them and others like them is herein called a conductor. Conductor clamp 79 joins jacket 21 and casing 19 firmly and electrically together, by tightly adjusting its clamp-bolt 80. To accentuate and accelerate contact between the mercury and contact end 41 of the contact wire when the setting temperature is reached, the contact end 18 of the sensing tube advantageously is constricted to provide the capillary 81.

Knurled locking nut 85, when positioned (as FIG. 2 shows) with its locking end screwed tightly against the inner end of jacket 21, restrains the latter and plunegr 26 against axially longitudinal movement relative to one another. Adapter split ring 82 (similarly to adapter ring 74) serves to lock the radially outwardly extending flange at the outer end of the switch end of tube 11 axially inwardly of the radially inwardly extending flange at the outer end of coupling 16. Its inside threads are screwed sufficiently along the outside threads at the lower end of casing 19 to grasp the two "Teflon" washers 83 (which can be one) tightly between the respective neighboring ends of tube 11 and casing 19.

As seen in FIGS. 2 and 4, the inner or anchored end of contact wire 42 is friction-fitted into a bore for it in the outer or lower end of contact wire holder 84 terminating in contact-wire-securing nipple 86 which is crimped against wire 42 to assure its retention in holder 84. Capillary-plugging sleeve 88 (of resiliently yieldable rigid material, advantageously "Teflon" plastic) encloses contact wire 42 from just posterior to its exposed end 41 to the shoulder at the base of nipple 86. From a point intermediate its ends, and anterior to nipple 86, and to the latter's base, sleeve 88 is of increased diameter (about that of holder 84) thereby forming an engaging or retaining shoulder 89.

Wire holder 84 is externally threaded from the base of nipple 86 longitudinally inwardly to a point past the lower interior shoulder of casing 19. Lock-nut 90 is screwed over those threads to a point near their inner end. Internally threaded retainer nut 91 is slipped over plugging sleeve 88 and screwed onto the threads on wire holder 84 until the radially inwardly extending engaging flange 92 engages shoulder 89 of sleeve 88. Lock-nut 90 then is rotated to move forwardly to engage the inner end of retainer nut 91 to lock it against unscrewing during operation of contact wire holder 84. The washers 83 fit snugly tightly about the outer peripheral surface of retainer nut 91 even though it is axially longitudinally movable to and fro through them.

Locking nut 94 for contact wire holder 84 is screwed over the lower outside threads on connector nipple 96 (a conductor). Contact wire holder 84 is electrically insulatedly anchored in, so as to be rotatable with, nipple 96 by being frictionally tightly fixedly fitted into conductor sleeve 98. The latter is fixedly imbedded in rigid plastic electrical insulator 99. Thus, contact wire 42 is insulated from casing 19 and nipple 96, both of which in turn are in electrical conduction connection with clamp 79.

Over the upper outside threads of nipple 96 (and in electrical conduction connection with it) is screwed the open end 101 (a conductor) of a standard two wire adapter plug 102 (not part of the invention). In that plug, the bare wire 103 in contact with conductor end 101 is wound around the insulation 104, and finally terminates in the external insulated wire ending in the U-connector 105. The insulation 104 covers the conductor 106 which is in electrical conduction connection with contact wire holder 84 and thus with wire 42, and appears outside the plug in the insulated wire ending in the other U-connector 108. These connectors 105 and 108 are connected to a standard relay (not shown) for turning off or on, say, a heating element in the bath being controlled.

It is advantageous for sensing tube 11 to be made of transparent material, such as glass, and beneficially "Pyrex" glass; thereby providing easy observation of the location of the ends of plungers 21 and 26 and the mercury 40, as well as the capillary plug 88 and the exposed end 41 of contact wire 42.

For the thermoregulator of the invention to maintain a fluid, such as a constant temperature bath, at a selected temperature set on the counter wheels and within the overall range, certain elements of the device must be inter-related. Thus, for an overall range of, say, one hundred degrees centigrade, the gear ratio of drive gear 35 to pinion 44, and the threads per inch on operating screw spindle 25 must be such that when the counter wheels have been turned from the zero setting (as seen in FIG. 2) to show a setting of 100, then temperature-setting plunger 26 will have been withdrawn into the device a distance such that the total displacement of the outer end of plunger 26 equals the volume of the expansion of the sensing liquid (e.g. the mercury) resulting by raising its temperature from zero to one hundred degrees centigrade.

In other words, the gear ratio of drive gear 35 to pinion 44 must be so correlated with the pitch of operating spindle 25 for the displacement of the outer end of plunger 26 from the zero setting to the selected control temperature to equal the increment of volumetric expansion of the used (i.e. given) volume of sensing liquid over the corresponding rise in temperature. For example, 78.83 grams of mercury expands in volume one-tenth of a milliliter as its temperature is raised from zero to one hundred degrees centigrade.

Therefore, in the specific embodiment, giving operating spindle 25 a pitch of thirty-two threads per inch requires sixteen teeth on pinion 44 for fifty teeth on drive gear 35, for 78.83 grams of mercury in sensing tube 11, to cover the range from zero to 100 as the total indication on the three wheels of counter 28, and the diameter of the outer end of plunger 26 is such that one inch of its length has a volume of one-tenth of a milliliter; using a standard counter wheel counter. The counter is graduated to cover 100° C. in divisions of 0.02° C. That enables reading (by estimating between divisions) to 0.01° C. The carefully built device provides an accuracy in regulation of a constant temperature bath of 0.2° C. or 0.5%, whichever is the greater.

The thermoregulator of the invention is rugged and sturdy. It can be completed at the maker's plant with the required amount of sensing liquid, e.g. mercury, already charged into it by filling under high vacuum (e.g. by a diffusion pump to a vacuum of about ten to the minus fourth millimeters of mercury). In that case, breakage of the continuity of the mercury column during shipping can be prevented by loosening locking nut 94 and turning nipple 96 (to plug the top of capillary 81) to move contact wire holder 84 downward until the lower end of capillary-plugging sleeve 88 closes off the top of capillary 81. Then locking nut 94 is turned in the opposite direction until it again is locked tightly against the upper end of casing 19.

To prepare the thermoregulator for operation at the user's laboratories, locking nut 94 is turned to allow turning nipple 96 to raise contact wire holder 84 to remove capillary-plugging sleeve 88 from the top of capillary 81 and raise the exposed end 41 of contact wire 42 till its lower tip is just at about the top of capillary 81 (e.g. as seen in FIG. 2). Then locking nut 94 is turned in the reverse direction to lock it tightly against the upper end of casing 19.

It is advisable initially to check the setting of the thermoregulator, thus: connectors 105 and 108 are connected to the respective terminals of the relay that operates the heating element of a constant temperature bath. The sensing tube is immersed in the bath to just submerge all of the mercury. If the counter reading is not the same as the bath temperature as measured by an accurate thermometer, the counter must be re-set. Re-setting knob 110 is pulled down until the counter-wheels 51 are free-rotating, and knob 110 is turned until the numbers on wheels 51 read as close as possible to the temperature of the bath as shown by the thermometer. Re-setting knob 110 then is pushed back into its locked position. The thermoregulator then can be used to regulate a bath at any selected temperature within the hundred degree range.

The embodiment with the standard counter wheel counter, as referred to above, can be set to regulate a bath for any one hundred degree centigrade range, say from within −35° C. to 135° C. For example, to set it to operate within the range of 35° C. to 135° C., after the thermoregulator had been set to operate in the 0° C. to 100° C. range: pull out re-setting knob 110 and rotate it to add 35 to the last reading of counter wheels 51; then push knob 110 back into its locked position. Then, turn locking nut 85 to allow rotating jacket 21 about plunger 22 (by holding the housing 24 stationary). Immerse sensing tube 11 in a bath. Set counter 28 at the bath temperature (as shown by an accurate thermometer) by turning the turning knob 31 to show that temperature figure on wheels 51. Then alternately keep rotating jacket 21 (while holding housing 24 stationary) and immersing sensing tube 11 in the bath until operation of the relay maintains the bath at that indicated temperature. Then turn locking nut 85 in the reverse direction to lock it tightly against jacket 21.

Then sensing tube 11 should be re-aligned, by loosening clamp-bolt 80 to loosen clamp 79, and rotating tube 11 in coupling nut 15. After tube 11 is re-aligned, clamp-bolt 80 is tightened again.

For the specific embodiment with the pitch and gear ratios mentioned above column —, one full rotation of jacket 21 is made to correspond to 50° C., or a displacement for range-setting plunger 22 of one milliliter per inch.

As is known, the "Teflon" plastic is the molded tetrafluoroethylene resin or polymer (i.e. polymerized tetrafluoroethylene) described in U.S. Patent 2,230,654 (Roy J. Plunkett) issued February 4, 1941. Other molded polyethylene (substituted or unsubstituted) polymers or resins, for example, poly-halogenoethylene resins such as the polymer of trifluoroethylene chloride known under its trademark "Kelef" can be used, as well as any unsubstituted non-hesive polyethylene polymer such as polyethylene itself or co-polymers of any of them. All of these are resiliently yieldable rigid plastic materials.

Moreover, it is advantageous to use the "Teflon" plastic, or any of the foregoing just described materials as the sleeve 69, bushing ring 72, adapter rings 74 and 82, gasket 75, washer rings 83, and capillary-plugging sleeve 88, because these plastic materials have a low coefficient of friction and permit a rigid object to be moved across them without the intervention of a lubricant. Thus, "Teflon" and the above described materials are referred to as easy-sliding-enabling, resiliently yieldable rigid plastic materials when they are specifically selected to avoid the use of a lubricant, because of their particularly low coefficient of friction.

Otherwise, when they, or any other material, having resiliently yieldable rigidity to return to its original size and shape after release of applied pressure, are used in an application where no other object has to be moved back and forth over them, they may be referred to merely as a resiliently yieldable rigid material.

Wherever a lubricant needs to be used in the thermoregulator, particularly where a part which is not easy-sliding-enabling has to move in contact with some other such part, it is best to use a lubricant, and particularly one which is effective also at the elevated temperature of the operating range of the thermoregulator, such as an organic silicone grease.

The thermoregulator of the invention is not restricted to operation over a range extending solely one hundred degrees centigrade for each specific axially longitudinal adjustment of jacket 21 and range-setting plunger 22 relative to one another. That extent of range is convenient with the common ordinary standard counter. Otherwise, by suitable changes in the graduations on the counter wheels 51, and/or ratio to the transfer wheels and in some other one or more of the significant parts or elements, operation can be adjusted to enable operation within a range of some other extent and/or on some other temperature scale.

It is also possible to have a modification that omits the parts required for range-setting plunger 22 and its operation and change adjustment, and thus has solely the temperature-setting plunger combination for use alone in adjusting the location of the space occupied by the fixed-contact end of the mercury.

The various features of the invention are applicable not only to thermoregulators wherein the expanding electrical-conductor sensing liquid completes a circuit when it meets a contact wire. It is applicable also to those wherein the circuit is completed or made operative otherwise, and even to those wherein the sensing liquid need not be electrical-conducting. That is so because the nature of the sensing liquid and how it works to initiate operation of the circuit controlling the means for adjusting the temperature within the bath is not critical, other than that the sensing liquid should expand or contract responsive respectively to an increase or drop in its temperature and should not volatilize or freeze during its use.

Thus, the sensing liquid may initiate operation of such circuit by some other electrical response, such as capacitative, or inductive, for example, by an electrical-connected band embracing the sensing tube at the level where the end of contact wire 41 would be and in place of it.

Similarly, a photo-electric response may be relied on, by having a photo-electric cell and a light diametrically opposed outside of the sensing tube at that location, and relying on the cutting off of the light beam when it is crossed by the expansion of a light opaque sensing liquid. Mechanical means may even be used, for example, a lever supported ball or horizontal disc suspended within the sensing tube, to be contacted and raised by the rising expanding sensing liquid, and thus move the lever to start the operation.

All of these may be referred to broadly as a stable sensing liquid that expands or contracts responsive respectively to a rise or fall in its temperature. Then the contact point of any of these various, or equivalent, types is broadly called the motivating contact which excites the activation of the operation of the means or element that adjusts the body of fluid, e.g. a constant temperature bath, to the selected temperature. That contact then can be called a motivating contact for controlling operation of a temperature-adjusting element or means.

While the invention has been illustrated by the foregoing detailed description of certain specific embodiments of it, it is understood that various modifications and substitutions may be made therein within the scope of the appended claims which are intended to cover also equivalents of the herein disclosed specific embodiments.

What is claimed is:

1. A thermoregulator for maintaining a body of fluid at a selected temperature level, by relying on the alternate changes in volume of a confined quantity of a temperature-sensing liquid responsive to corresponding changes in its temperature respectively to stop or initiate operation of an element to adjust the temperature of said fluid, which thermoregulator comprises a sensing tube containing a quantity of such a temperature-sensing liquid; a motivating contact for controlling operation of said temperature-adjusting element, located near one part of said sensing liquid where it can excite said contact upon expanding to it as its temperature rises; a temperature-setting plunger having its head in contact with a second part of said sensing liquid remote from said one part of it; displacing means for moving said plunger head; confining means for retaining constant contact of said plunger head with said sensing liquid wherever said head is moved; an indicator having an indicating area and number placing means that can show at said area any selected one of various numbers, each different one of which represents the corresponding number of one of various temperatures at which the thermoregulator separately can maintain said fluid body; inter-related operating means for setting at said indicating area the number corresponding to a selected temperature at which the fluid body is to be maintained, and for simultaneously positioning the head of the temperature-setting plunger to adjust the sensing liquid near the motivating contact such distance from it that the increment of volume expansion of the sensing liquid at reaching that selected temperature will cause said liquid then to excite said contact.

2. A thermoregulator for maintaining a body of fluid at a selected temperature level, by relying on the alternate changes in volume of a confined quantity of a temperature-sensing liquid responsive to corresponding changes in its temperature respectively to stop or initiate operation of an element to adjust the temperature of said fluid, which thermoregulator comprises a housing; an aperture in said housing; a sensing tube containing a quantity of such a temperature-sensing liquid and joined by joining means to said housing at said aperture and communicating therethrough; in said housing and mounted for axially-longitudinal movement therein a temperature-setting plunger having its head in contact with said sensing liquid; an indicator having an indicating area and number placing means that can show at said area any selected one of various numbers, each different one of which represents the corresponding number of one of various temperatures at which the thermoregulator separately can maintain said fluid body; a motivating contact for controlling operation of said temperature-adjusting element and located near a part of said sensing liquid remote from the plunger head and where said liquid can excite said contact upon expanding to it as said liquid reaches the temperature whose number is shown at the indicating area of the indicator; means (A) for changing the number to be shown at said indicating area; means (B) to impart axially longitudinal movement to the plunger; and driving means operatively connected with each of said means (A) and (B) to motivate both of them simultaneously; confining means for retaining constant contact of said plunger head with the sensing liquid wherever said head is moved; the incremental movement of said number changing means, the axially longitudinal incremental displacement of the plunger, the transverse area of its head, and the volume of sensing liquid in the sensing tube being so correlated that when the number shown on the indicating area of the indicator is that of the temperature at which the body of fluid is desired to be maintained, the increase in volume of the sensing fluid will cause it to excite the motivating contact for controlling operation of the temperature-adjusting element.

3. A thermoregulator as claimed in claim 2, which comprises also a range-setting plunger in a housing communicating with the sensing tube and having a head also in contact with the sensing liquid; said range-setting plunger being connected with means for imparting to it axially longitudinal movement independently of any movement of the temperature-setting plunger.

4. A thermoregulator as claimed in claim 3, which comprises also confining means for retaining constant contact of the head of said range-setting plunger wherever said head is moved; whereby the part of the sensing fluid near the motivating contact can be positioned at a different location in relation thereto independently of any change in relative location between them imparted to the sensing fluid by any movement of the temperature-setting plunger.

5. A thermoregulator as claimed in claim 4, wherein the range-setting plunger is cylindrical and axially hollow and encircles the temperature-setting plunger.

6. A thermoregulator as claimed in claim 5, wherein a sleeve of a resiliently yieldable rigid material is coaxially mounted on, and anchored to, the head end of the range-setting plunger; and the head end of the temperature-setting plunger is supported in fluid-tight axially longitudinal movable engagement with the interior or said sleeve.

7. A thermoregulator as claimed in claim 2, wherein the indicator is a conventional counter having mounted on a shaft a plurality of side by side wheels bearing numbers on their respective peripheral surfaces, and transfer wheels to turn a succeeding wheel when the next lower number range wheel has completed a turn; and wherein the means operatively connected to means (A) and (B) is an operating screw spindle.

8. A thermoregulator as claimed in claim 7, wherein said means (A) comprises a drive gear mounted on said spindle with its teeth in operating engagement with a pinion on the shaft of the counter.

9. A thermoregulator as claimed in claim 8, wherein the means (B) comprises an outside threaded portion of said spindle coaxially inserted and in threaded engagement with inside threads in a sleeve extending from the temperature-setting plunger; and means restraining said sleeve against rotation.

10. A thermoregulator as claimed in claim 9, wherein the sensing liquid is mercury and 78.83 grams of it are used; the displacement of the head of the temperature-setting plunger is one-tenth millimeter per inch of its axially longitudinal movement; the drive gear teeth are directly enmeshed with those of the pinion on the counter's wheel shaft, and the respective teeth are in the ratio of fifty drive gear teeth to sixteen teeth on the pinion.

11. A thermoregulator for maintaining a body of fluid at a selected temperature level, by relying on the alternate changes in volume of a confined quantity of a temperature-sensing liquid responsive to corresponding changes in its temperature respectively to stop or initiate operation of an element to adjust the temperature of said fluid, which thermoregulator comprises a sensing tube containing a quantity of such a temperature-sensing liquid; an extension at one end of said sensing tube beyond the level of the sensing liquid; a closure in said extension and spaced away from the sensing liquid; axially longitudinally movably supported from said closure a plug of such dimensions and shape that can plug off the sensing tube adjacent that end of the sensing liquid and thereby prevent the breaking of the continuity of the sensing fluid during transportation of the thermoregulator; and means operable from without said extension for axially longitudinally moving said plug to a position wherein it thus plugs off the sensing liquid in the sensing tube, and for removing said plug from said plugging off position when the thermoregulator is to be operated again.

12. A thermoregulator for maintaining a body of fluid at a selected temperature level, by relying on the alternate changes in volume of a confined quantity of a temperature-setting liquid responsive to corresponding changes in its temperature respectively to stop or initiate operation of an element to adjust the temperature of said fluid, which thermoregulator comprises a sensing tube containing a quantity of such a temperature-sensing liquid; an extension at one end of said sensing tube beyond the level of the sensing liquid; a closure in said extension and spaced away from the sensing liquid; axially longitudinally movably supported from said closure a plug of such dimensions and shape that can plug off the sensing tube adjacent that end of the sensing liquid and thereby prevent the breaking of the continuity of the sensing fluid during transportation of the thermoregulator; means operable from without said extension for axially longitudinally moving said plug to a position wherein it thus plugs off the sensing liquid in the sensing tube; an axial constriction in the sensing tube and near and below said extension; and the sensing liquid is electrically conductive and ends in said restriction.

13. A thermoregulator as claimed in claim 12, wherein a holder for a contact wire depends from said closure and is coaxial with the sensing tube constriction; and said plug is supported from said contact wire holder; and a contact wire depends from said holder and is coaxially and fixedly held therein.

14. A thermoregulator as clamed in claim 13, wherein said plug comprises a sleeve of a resiliently yieldable rigid material embracing said wire posterior of its contact end and substantially fixedly held thereon; and the means for moving the plug to plug off the sensing liquid thus will move the exposed end of said wire and lower end of said skirt into tight fit in the top of said contriction thereby to close it off.

15. A thermoregulator as claimed in claim 14, wherein said skirt of resiliently yieldable material has a downwardly facing shoulder intermediate its ends and is held fixedly secured to said holder by a sleeve of firmer material and having a radially inwardly extending flange fitted over said first sleeve until said flange engages said shoulder, and said flanged sleeve is secured to said holder by securing means that restrain it against coming off of said holder in use.

References Cited in the file of this patent
UNITED STATES PATENTS

| | | |
|---|---|---|
| 2,325,197 | Van Guilder | July 27, 1943 |
| 2,717,938 | Laing | Sept. 13, 1955 |
| 2,802,081 | Myrent et al. | Aug. 6, 1957 |